United States Patent [19]
Ueda et al.

[11] Patent Number: 5,650,567
[45] Date of Patent: Jul. 22, 1997

[54] ACCELERATION SENSOR WITH OPPOSED AMPLIFIER AND DETECTION SECTIONS

[75] Inventors: Shinjiro Ueda, Katano; Akinori Hasegawa, Takasago; Noriyuki Jitosho, Hirakata, all of Japan

[73] Assignee: Matsushita Electric Industrial Co., Ltd., Kadoma, Japan

[21] Appl. No.: 528,396

[22] Filed: Sep. 14, 1995

[30] Foreign Application Priority Data

Sep. 19, 1994 [JP] Japan ................................ 6-223353

[51] Int. Cl.$^6$ ............................................. G01P 1/02
[52] U.S. Cl. ........................ 73/493; 73/514.33; 73/514.36
[58] Field of Search .......................... 73/493, 514.12, 73/514.16, 514.21, 514.23, 514.32, 514.33, 514.34, 514.36

[56] References Cited

U.S. PATENT DOCUMENTS

| | | | |
|---|---|---|---|
| 4,164,263 | 8/1979 | Heintz et al. | 73/514.33 |
| 4,700,973 | 10/1987 | Gademann et al. | 73/514.12 |
| 5,003,824 | 4/1991 | Fukada et al. | 73/514.34 |
| 5,345,823 | 9/1994 | Reidemeister et al. | 73/514.32 |

FOREIGN PATENT DOCUMENTS

| | | |
|---|---|---|
| 540071A1 | 5/1993 | European Pat. Off. . |
| 542436A1 | 5/1993 | European Pat. Off. . |
| 557917A1 | 9/1993 | European Pat. Off. . |
| 9309918.5 | 12/1993 | Germany . |

Primary Examiner—John E. Chapman
Attorney, Agent, or Firm—Renner, Otto, Boisselle & Sklar

[57] ABSTRACT

An acceleration sensor includes a case having a bottom part, a pair of opposed walls substantially perpendicular to the bottom part, and a pair of first projections located on the bottom part. The sensor further includes a detection section attached to the case via the pair of first projections for detecting an acceleration and outputting a signal indicating the acceleration, and a spacer located on the bottom part of the case. In addition, the sensor includes an amplifier circuit board attached to the case in the state of being opposed to the detection section with the spacer interposed therebetween and having an amplifier on a substrate thereof for amplifying the signal output by the detection section. Relay terminals are provided for electrically connecting the detection section and the amplifier circuit board, together with output terminals electrically connected to the amplifier circuit board for supplying the amplified signal to an external circuit. The detection section is surrounded by the case, the spacer and the amplifier circuit board. The case has projections used for attaching the acceleration sensor to the object.

10 Claims, 5 Drawing Sheets

ACCELERATION SENSOR WITH OPPOSED AMPLIFIER AND DETECTION SECTIONS

BACKGROUND OF THE INVENTION

1. Field of the Invention

The present invention relates to an acceleration sensor used in, for example, an air bag system of an automobile for detecting an acceleration caused by, for example, impact.

2. Description of the Related Art

A conventional acceleration sensor 50 will be described with reference to FIGS. 4A, 4B, 5A and 5B. FIG. 4A is a top view of an acceleration sensor 50, and FIG. 4B is a cross sectional view of the acceleration sensor 50 along lines 4B—4B in FIG. 4A.

The acceleration sensor 50 includes a base 21, a circuit board 23 bonded on a surface of the base 21, a detection section 24 bonded on a surface of the circuit board 23 for detecting an acceleration to be sensed, and a cover 22 fixed to the base 21 by welding or the like for creating a sealed inner space 27 in which the circuit board 23 and the detection section 24 are located. The cover 22 prevents foreign substances from entering the inner space 27. The detection section 24 on the circuit board 23 is connected to terminals 25 fixed to the base 21 in the state of being electrically insulated from the base 21, and is connected to an external circuit via the terminals 25. The base 21 has holes 21a in the vicinity of two ends thereof for attaching the acceleration sensor 50 to a prescribed position of an object for which an acceleration is to be sensed, for example, an automobile.

The acceleration sensor 50 is used in an electric circuit for controlling the operation of, for example, an air bag system of an automobile. The acceleration sensor 50 is attached to a prescribed position of an automobile by inserting screws through the holes 21a, and the terminals 25 are electrically connected to a circuit board (not shown) on which the electric circuit for controlling the operation of the air bag system is located.

FIG. 5A is a top view of the detection section 24, and FIG. 5B is a cross sectional view of the detection section 24 along lines 5B—5B in FIG. 5A.

The detection section 24 includes a fixed portion 24b and a movable cantilever beam 24a extended from the fixed portion 24b. The detection section 24 includes a space 24e below the cantilever beam 24a for allowing the cantilever beam 24a to move. The cantilever beam 24a includes a base portion 24c and a weight portion 24d extending out from the base portion 24c. The weight portion 24d is thicker than the base portion 24c. A strain detector 26 is located on the base portion 24c of the cantilever beam 24a.

The conventional acceleration sensor 50 operates in the following manner.

The acceleration sensor 50 is attached to, for example, an automobile by screws or the like. Movement of the automobile is transmitted to the base 21. Then, the movement is transmitted to the fixed portion 24b via the circuit board 23, and further to the cantilever beam 24a. Thus, the cantilever beam 24a is moved by the force of inertia of the weight portion 24d. By such movement of the cantilever beam 24a, the base portion 24c is bent in proportion to the acceleration caused by the movement. By appropriately setting the thickness of the base portion 24c and the weight portion 24d, the amount of bending is detected as a change in the resistance of the strain detector 26. A signal indicating the amount of bending detected by the strain detector 26 is amplified by an amplifier (not shown) provided on the circuit board 23 and is output from the terminals 25 to the circuit board in the automobile as a signal indicating the amount of detected acceleration.

In the conventional acceleration sensor 50, the amplifier and the detection section 24 are provided on the circuit board 23. Thus, the entire structure of the acceleration sensor 50 is enlarged, which enlarges the air bag system provided with the acceleration sensor 50. Moreover, since the conventional acceleration sensor 50 is attached to the object for which an acceleration is to be sensed by inserting screws through the holes 21a, the liberty in attachment is restricted and the attachment process is complicated.

SUMMARY OF THE INVENTION

An acceleration sensor according to the present invention includes a case having a bottom part, a pair of opposed walls substantially perpendicular to the bottom part, and a pair of first projections located on the bottom part; a detection section attached to the case via the pair of first projections for detecting an acceleration and outputting a signal indicating the acceleration; a spacer located on the bottom part of the case; an amplifier circuit board attached to the case in the state of being opposed to the detection section with the spacer interposed therebetween and having an amplifier on a substrate thereof for amplifying the signal output by the detection section; relay terminals for electrically connecting the detection section and the amplifier circuit board; and output terminals electrically connected to the amplifier circuit board for supplying the amplified signal to an external circuit.

In one aspect of the present invention, the amplifier circuit board has a pair of lands, the pair of walls of the case each have a tongue in contact with the lands respectively in the state of being bent, and each of the lands and the respective tongue are bonded to each other by soldering.

In one aspect of the present invention, the spacer has a frame surrounding the detection section.

In one aspect of the present invention, the spacer has a plurality of bosses on a bottom surface thereof integral with the spacer for preventing electric contact between the output terminals and the case.

In one aspect of the present invention, areas where the case, the spacer, and the amplifier circuit board are in contact with one another are coated with a coating agent to seal an inner space which is defined by the case, the spacer and the amplifier circuit board and includes the detection section.

In one aspect of the present invention, the amplifier circuit board has a circuit adjustment section on a top surface of the substrate thereof for adjusting an amplification factor of the amplifier.

In one aspect of the present invention, the bottom part of the case has a pair of second projections in the vicinity of two corners thereof used for attaching the acceleration sensor to an object for which an acceleration is to be sensed.

In one aspect of the present invention, the pair of walls of the case each have e third projection and a cutout formed at the foot of the third projection. The third projection is bent so that the concave surface thereof faces inward.

In one aspect of the present invention, the pair of first projections of the case have first holes respectively, the detection section has a pair of second holes aligned with the first holes, and the detection section is attached to the first projections of the case in the state of being elevated from the bottom part of the case.

In one aspect of the present invention, the detection section is attached to the case by caulking a rivet inserted through the first holes and the second holes.

Thus, the invention described herein makes possible the advantage of providing a small acceleration sensor which can be attached more easily with sufficient liberty.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
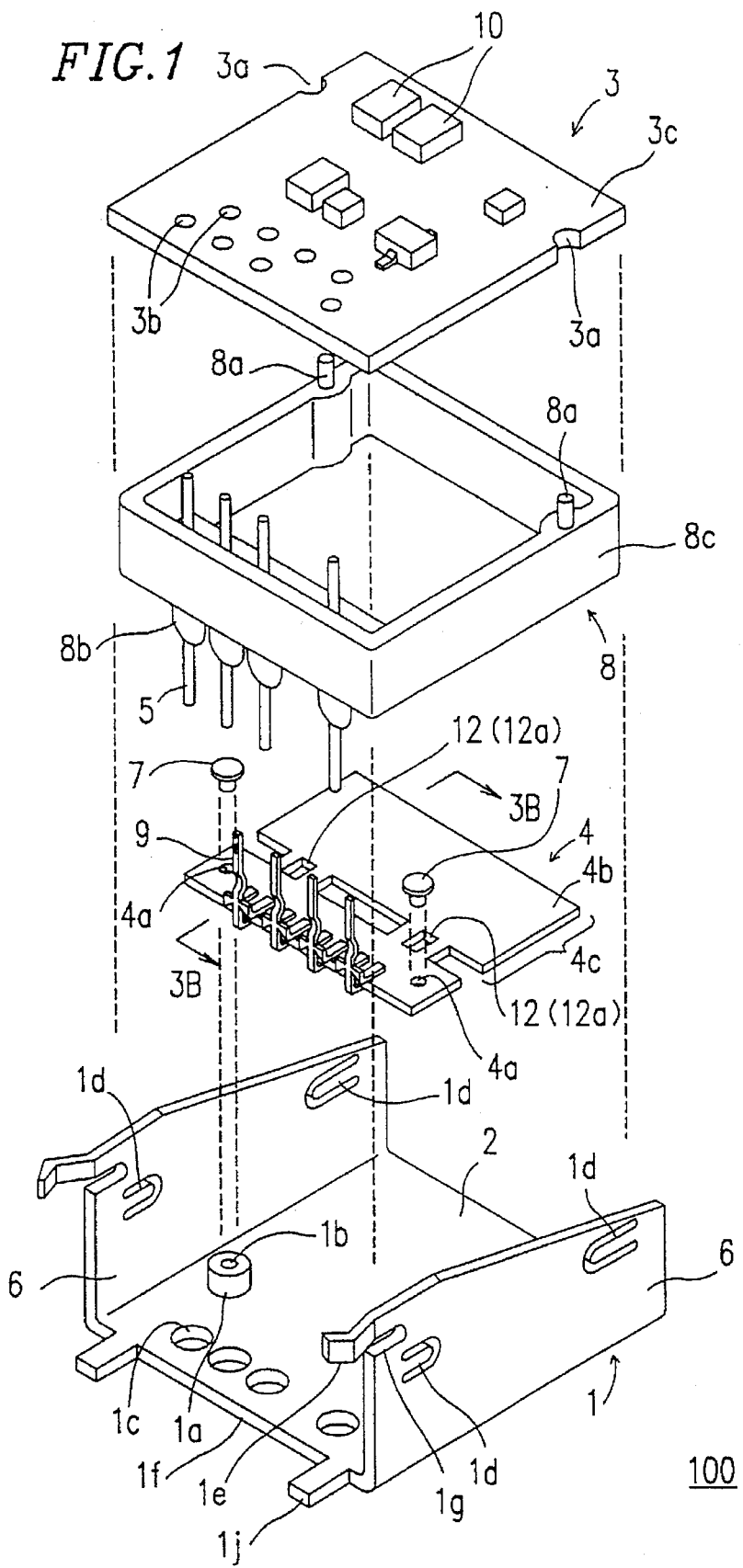
FIG. 1 is an exploded isometric view of an acceleration sensor in an example according to the present invention.
Figure 2A:
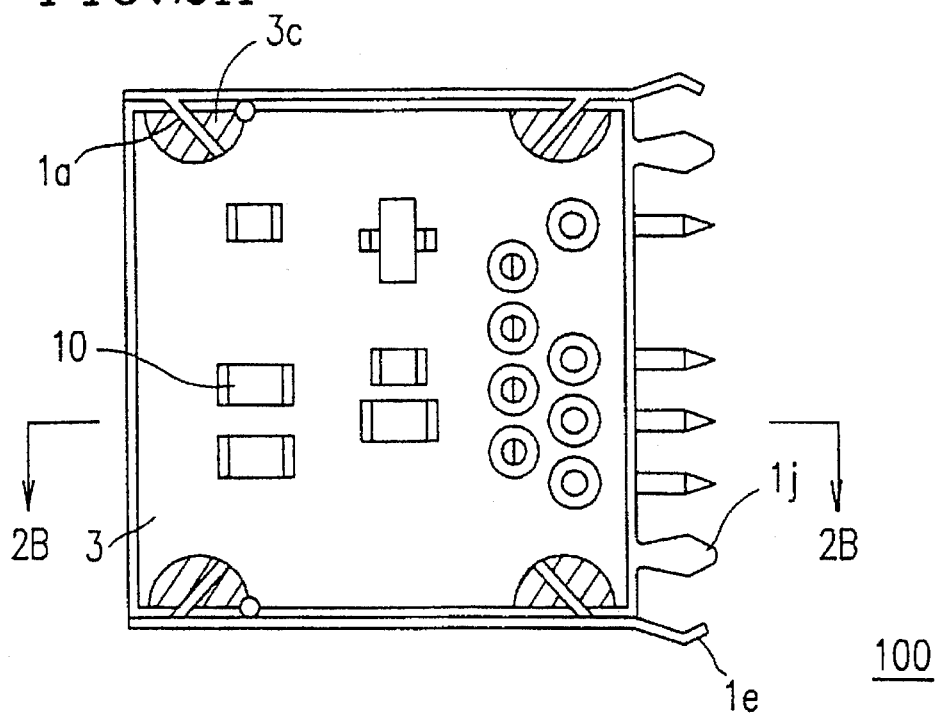
FIG. 2A is a top view of the acceleration sensor shown in FIG. 1.
Figure 2B:
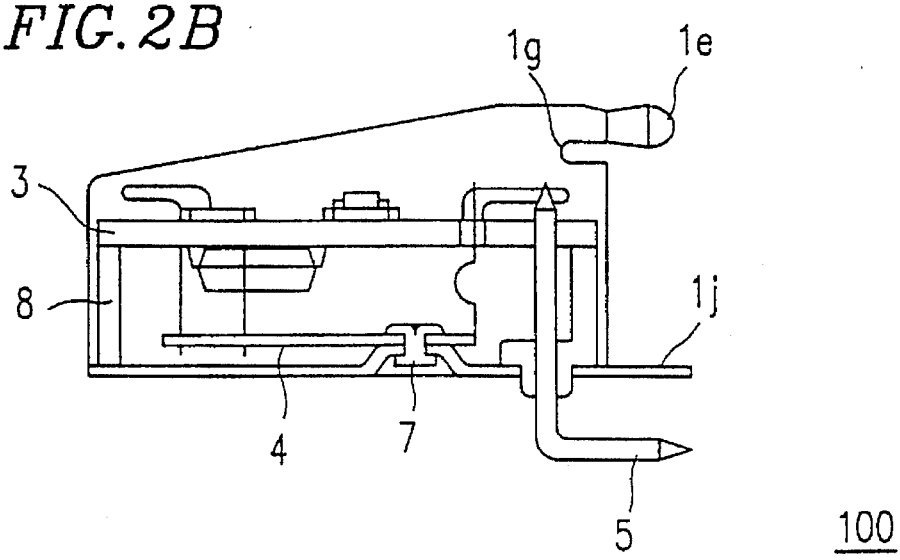
FIG. 2B is a cross sectional view thereof along lines 2B—2B in FIG. 2A.

An acceleration sensor 100 in an example according to the present invention bill be described with reference to FIGS. 1, 2A, 2B, 3A and 3B. FIG. 1 is an exploded isometric view of the acceleration sensor 100. FIG. 2A is a top view of the acceleration sensor 100, and FIG. 2B is a cross sectional view thereof along lines 2B—2B in FIG. 2A.

The acceleration sensor 100 includes a case 1, a detection section 4, an insulation spacer 8, and an amplifier circuit board 3.

The case 1 has a bottom part 2 and two walls 6 which are substantially perpendicular to the bottom part 2 and opposed to each other. The case 1 is formed to have such a shape by treating a metal plate having a thickness of 0.2 mm to 1.0 mm, for example, 0.4 mm by sheet metal working. As the material for the metal plate, tin-plated steel, solder-plated steel, cold-rolled steel or the like may be used.

The case 1 has a pair of projections 1a (only one of them is shown in FIG. 1) formed by drawing, and each projection 1a has a hole 1b at the center thereof. The bottom part 2 has a pair of projections 1j. Each projection 1j is respectively located in the vicinity of one of the two walls and extended from one of two ends of an edge 1f from which no wall is formed. The projections 1j are used to position the acceleration sensor 100 with respect to an object for which an acceleration is to be sensed (hereinafter, referred to simply as "object") such as an automobile (not shown). The bottom part 2 further has a plurality of holes 1c along the edge 1f for allowing output terminals 5 to be inserted therethrough.

Each wall 6 has a pair of tongues 1d used for attaching an amplifier circuit board 3 to the case 1. Each wall further has a substantially '<'-shaped projection 1e used for attaching the acceleration sensor 100 to the object. Each projection 1e extends substantially parallel to the bottom part 2 from a top corner of the wall 6 on the same side as the edge 1f, and is bent so as to have a substantially '<'-shape with the concave surface thereof facing inward. Each wall 6 further has a cutout 1g at the foot of the projection 1e.

Due to the projections 1j and the projections 1e, the acceleration sensor 100 can be attached to the object easily. Especially the projections 1e, which have the above-described shape, are distorted elastically when the acceleration sensor 100 is attached to the object, thus to allow for easy and secure attachment.

The cutouts 1g at the foot of the projections 1e are formed to enhance elasticity of the projections 1e when the projections 1e are inserted into the object. The cutouts 1g also absorb the stress generated by the elastic distortion of the projections 1e by the insertion and thus prevent transmission of the stress to the detection section 4.

The detection section 4 includes a metal core plate 4b, which has a pair of holes 4a at corresponding positions to the holes 1b in the projections 1a. The detection section 4 is attached to the case 1 using the holes 4a and the holes 1b as is described below in detail. The detection section 4 has a bridge circuit (FIG. 3A) including a pair of strain resistors 12a and a pair of strain resistors 12b (only 12a are shown in FIG. 1) and a plurality of relay terminals 9 connected to the strain resistors 12a and 12b. A free end of each relay terminal 9 is projected upward.

Figure 3A:
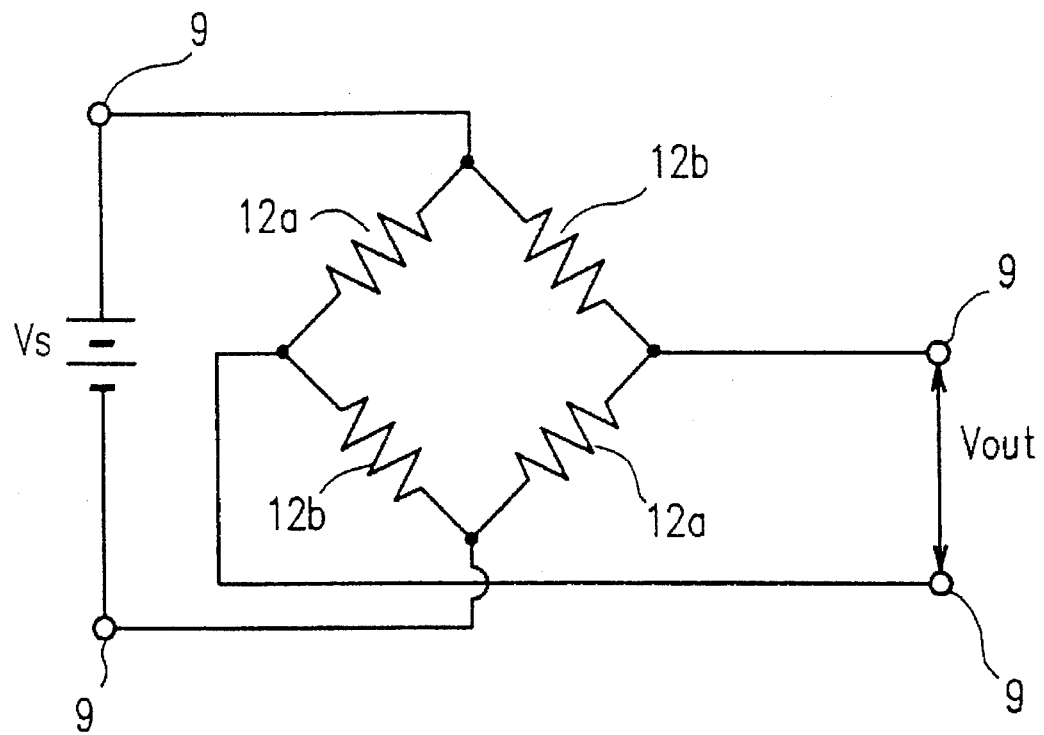
FIG. 3A is a circuit diagram of an equivalent circuit of a bridge circuit included in a detection section of the acceleration sensor shown in FIG. 1.
Figure 3B:
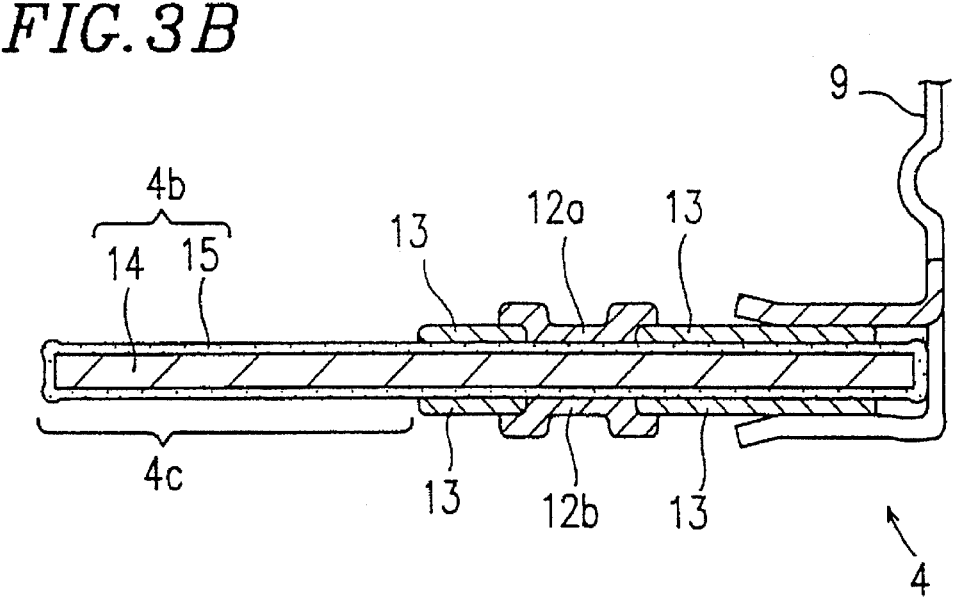
FIG. 3B is a cross sectional view of the detection section along lines 3B—3B in FIG. 1.
Figure 4A:
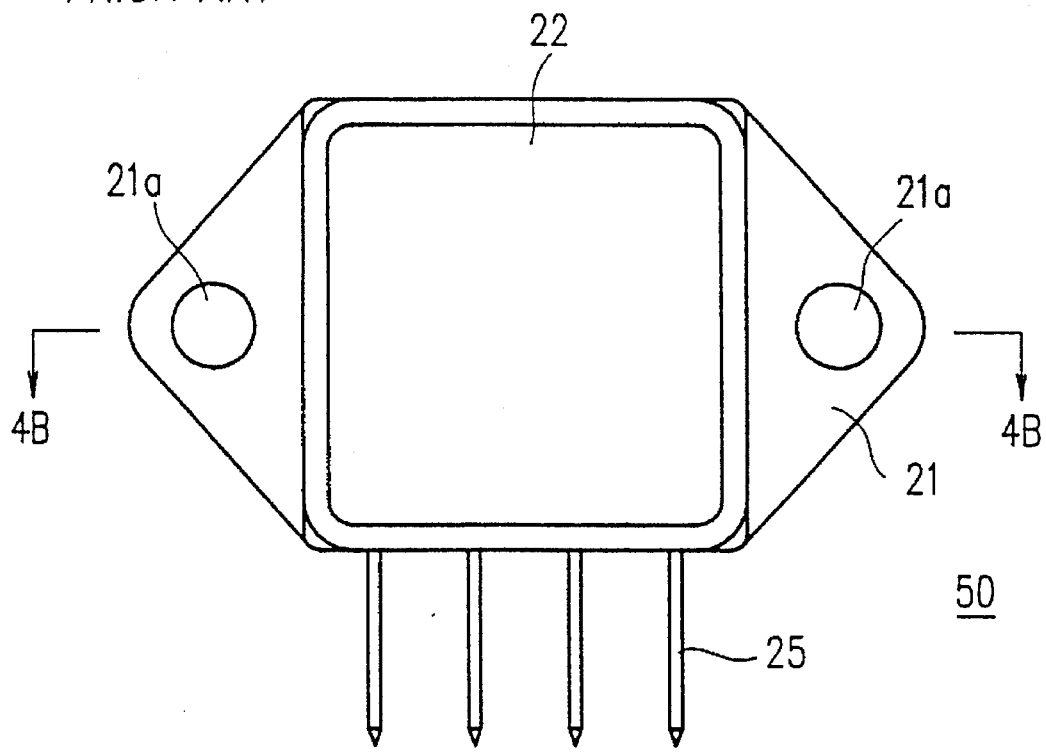
FIG. 4A is a top view of a conventional acceleration sensor.
Figure 4B:
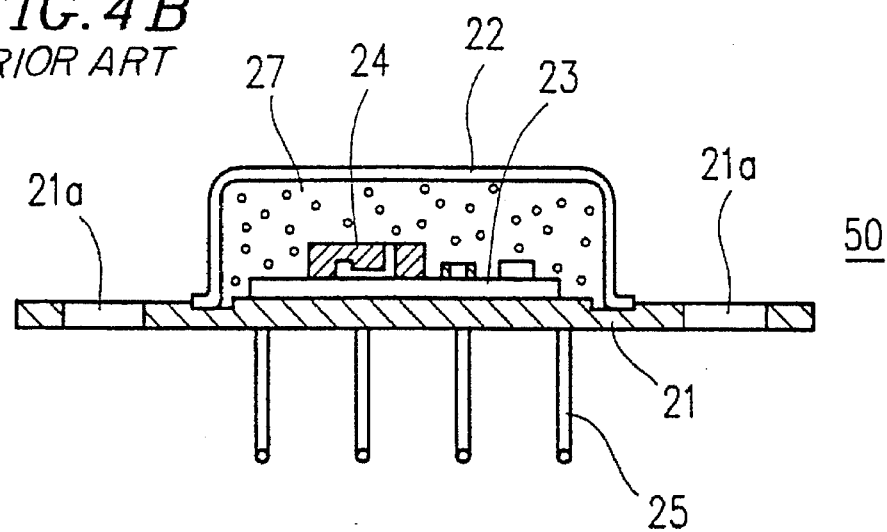
FIG. 4B is a cross sectional view thereof along lines 4B—4B in FIG. 4A.
Figure 5A:
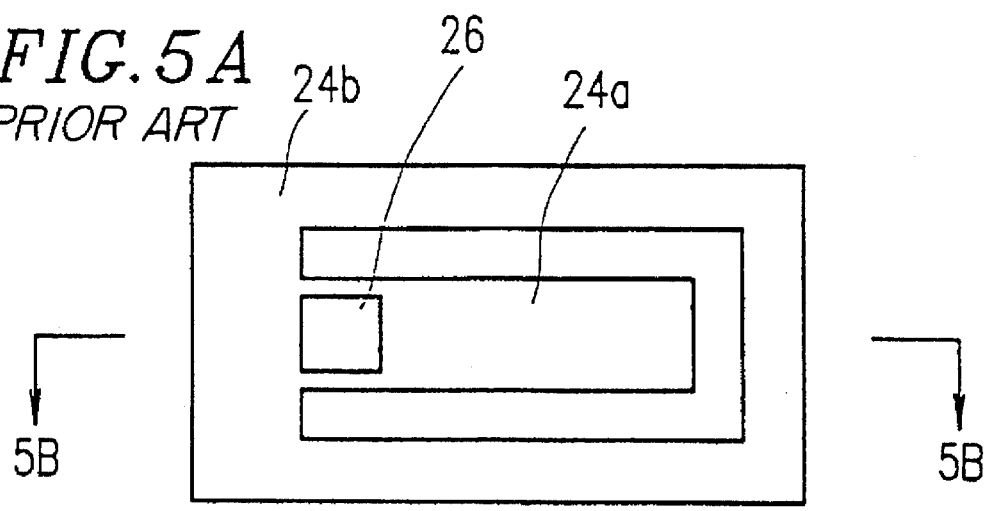
FIG. 5A is a top view of a detection section included in the conventional acceleration sensor.
Figure 5B:
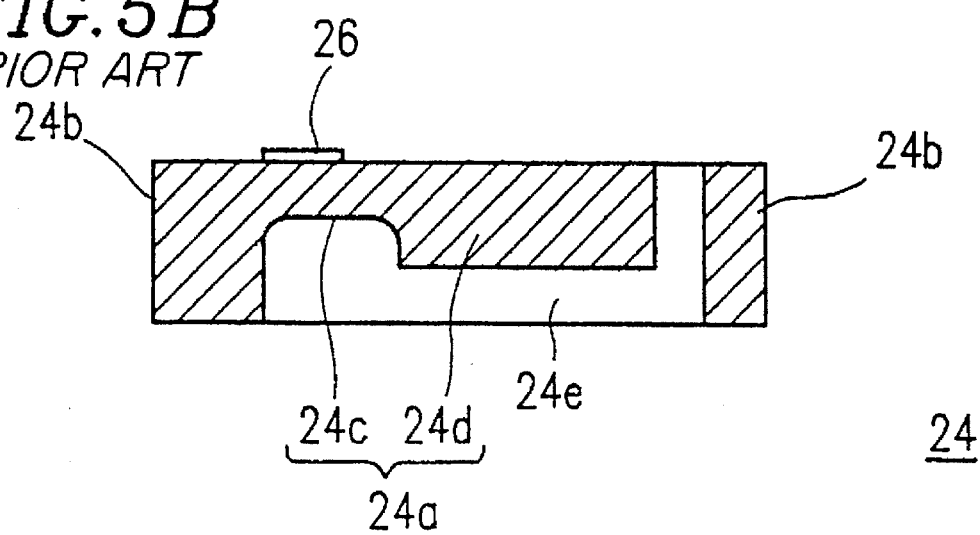
FIG. 5B is a cross sectional view thereof along lines 5B—5B in FIG. 5A.

FIG. 3B is a cross sectional view of the detection section 4 along lines 3B—3B in FIG. 1. The metal core plate 4b, which includes a base plate 14 formed of stainless steel or the like and a vitreous enamel layer 15 wrapping the base plate 14. The strain resistors 12a and 12b are provided on top and bottom surfaces of the vitreous enamel layer 15, respectively. The strain resistors 12a and 12b are each connected to an electrode 13 provided on the vitreous enamel layer 15. The electrodes 13 are typically formed of a Ag-based thick film material, but may be formed of a Au-based thick film material or the like.

The electrodes 13 are each connected to the relay terminal 9 located on the metal core plate 4b along the same side as the edge 1f. The relay terminals 9 are used to transmit an output signal from the detection section 4 to the amplifier circuit board 3.

The strain resistors 12a and 12b, the electrodes 13, and the relay terminals 9 are connected to form the bridge circuit shown in FIG. 3A. Between two of the relay terminals 9 corresponding to input terminals of the bridge circuit, an external power supply Vs is provided. From the bridge circuit, a voltage Vout indicating the acceleration detected by the acceleration sensor 100 is output across two of the relay terminals 9 corresponding to output terminals of the bridge circuit.

Returning to FIG. 1, an insulation spacer 8 has a frame 8c surrounding the detection section 4 which is rectangular. The insulation spacer 8 is typically formed of PBT (polybutyleneterephthalate), but may be formed of PPS (polyphenylenesulfide), polyamide, or the like.

A plurality of output terminals 5 are attached to the insulation spacer 8 by insert molding or press fitting. Each output terminal 5 is projected upward and downward from the frame 8c. The output terminals 5 are connected to the amplifier circuit board 3 and are used for supplying a final output signal from the acceleration sensor 100 to an external circuit.

A part of each output terminal 5 immediately below the frame 8c is covered by a boss 8b which is integrally formed with the frame 8c. A part of each output terminal 5 extending downward from the boss 8b is inserted into the respective hole 1c while being prevented from electrically contacting the case 1 by the boss 8b. Due to the boss 8b, electrical contact of the output terminals 5 to the case 1 is prevented even if the output terminals 5 are bent during transportation. Thus, defective operation of the acceleration sensor 100 can be avoided.

The insulation spacer 8 has a pair of projections 8a on top surfaces of opposed sides of the frame 8c. The projections 8a are used for attaching the amplifier circuit board 3 to the insulation spacer 8 as is described below.

The amplifier circuit board 3 is located opposed to the detection section 4 with the insulation spacer 8 being interposed therebetween. The amplifier circuit board 3 has circuit adjusting resistors 10 as well as capacitors, resistors and the like on a top surface of a substrate 3c. Such components form an amplifier. The substrate 3c has a pair of recesses 3a on a peripheral surface thereof at corresponding positions to the projections 8a. The substrate 3c also has a plurality of holes 3b along the same side as the edge 1f. The recesses 3a and the holes 3b are used for attaching the amplifier circuit board 3 to the insulation spacer 8 as is described below.

The above-described parts of the acceleration sensor 100 are assembled in the following manner.

The detection section 4 is attached to the case 1 by aligning the holes 4a to the holes 1b and caulking rivets 7 inserted into the holes 4a and 1b. Thus, the detection section 4 is elevated from the bottom part 2 of the case 1 by the height of the projections 1a. By use of caulking, the number of steps for attaching the detection section 4 to the case 1 is reduced.

After the detection section 4 is attached to the case 1, the insulation spacer 8 is attached to the case 1 while inserting the output terminals 5 of the insulation spacer 8 into the holes 1c of the case 1.

The amplifier circuit board 3 is then attached to the insulation spacer 8 in the following manner.

The amplifier circuit board 3 is positioned with respect to the insulation spacer 8 by respectively inserting the output terminals 5 extended from the insulation spacer 8 and the relay terminals 9 extended from the detection section 4 into the holes 3b and also by fitting the projections 8a with the recesses 3a. By setting the distance between the projections 8a to be slightly shorter than the distance between the recesses 3a, the amplifier circuit board 3 can be secured by the insulation spacer 8 with pressure.

The tongues 1d in the walls 6 are folded inward to hold the amplifier circuit board 3. Then, the output terminals 5 and the relay terminals 9 are soldered by heating with light radiation or the like to be electrically connected to the amplifier circuit board 3.

In this manner, the detection section 4, the insulation spacer 8, and the amplifier circuit board 3 are attached to the case 1.

The circuit adjusting resistors 10 are treated by laser trimming or the like to have a prescribed resistance. Thus, the amplification factor of the amplifier with respect to the acceleration signal output by the detection section 4 is adjusted to be a prescribed value. The acceleration sensor 100 is completed in this manner.

In the acceleration sensor 100 having such a structure, a rectangular part 4c of the metal core plate 4b which does not have the relay terminals 9 is flexible and can be moved sufficiently in an inner space defined by the case 1, the insulation spacer 8, and the amplifier circuit board 3.

The tongues 1d of the case 1 hold lands 3c (FIG. 2A) of the amplifier circuit board 3, respectively. By soldering the lands 3c and the tongues 1d, more secure attachment of the amplifier circuit board 3 to the case 1 is guaranteed, thus to increase the mechanical strength of the acceleration sensor 100.

The acceleration sensor 100 operates in the following manner.

First, the acceleration sensor 100 is attached to, for example, a circuit board for controlling the operation of an air bag system of an automobile (not shown) by insertion of the projections 1e and 1j and the output terminals 5 and soldering. In such a state, the movement of the object is transmitted to the detection section 4.

When the object moves, the strain resistors 12a and 12b and the vicinity thereof are bent by the force of inertia of the rectangular part 4c. Thus, the resistance of the strain resistor 12a on the top surface of the metal core plate 4b and the resistance of the strain resistor 12b on the bottom surface of the metal core plate 4b change in different polarities. As a result, the resistance of the bridge circuit is changed, and such a change is output as a voltage Vout from the bridge circuit shown in FIG. 3A and sent to the amplifier circuit board 3 via the relay terminals 9. The amplifier (not shown) on the amplifier circuit board 3, adjusted to have a prescribed amplification factor by the circuit adjusting resistor 10, amplifies the output Vout from the bridge circuit. The amplified signal is sent to the control board of the object via the output terminals 5 as a signal indicating the acceleration of the object.

The acceleration sensor 100 according to the present invention has a circuit adjustment section including the circuit adjusting resistor 10 for adjustment, on a top, namely, outer surface of the substrate 3c of the amplifier circuit board 3. Due to such a structure, the operation characteristics of the acceleration sensor 100 can be easily adjusted after the assembly of parts into the acceleration sensor 100. Accordingly, the number of steps for adjustment is reduced and the detection precision is improved.

The detection section 4 is surrounded by the case 1, the insulation spacer 8, and the amplifier circuit board 3, and further is opposed to the amplifier circuit board 3. Due to such a structure, invasion of foreign substances to the detection section 4 is prohibited, and the size of the acceleration sensor 100 is reduced. Especially the insulation spacer 8 surrounding the detection section 4 protects the detection section 4 from dust and the like, thus improving the detection quality.

The projections 1e facilitate attachment and electric connection of the acceleration sensor 100 to, for example, the circuit board of an air bag system of an automobile.

By treating the surface of the acceleration sensor 100 or at least contact areas of the case 1, the insulation spacer 8, and the amplifier circuit board 3 with dipping, spraying or the like with a coating agent, the inner space including the detection section 4 is sealed more reliably. Such coating is effective for preventing invasion of foreign substances into the inner space and thus for improving the reliability of the acceleration sensor 100.

The detection section 4 and the case 1 may be attached to each other using screws or pins, or welding to provide the same effects. One of such methods and caulking may be combined, in which case, the detection section 4 is attached to the case 1 with certain excessiveness and thus more reliably.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An acceleration sensor, comprising:
   a case having a bottom part, a pair of opposed walls substantially perpendicular to the bottom part, and a pair of first projections located on the bottom part;
   a detection section attached to the case via the pair of first projections for detecting an acceleration and outputting a signal indicating the acceleration;
   a spacer located on the bottom part of the case;
   an amplifier circuit board attached to the case in the state of being opposed to the detection section with the spacer interposed between the amplifier circuit board and the case, and having an amplifier on a substrate thereof for amplifying the signal output by the detection section;
   relay terminals for electrically connecting the detection section and the amplifier circuit board; and
   output terminals electrically connected to the amplifier circuit board for supplying the amplified signal to an external circuit.

2. An acceleration sensor according to claim 1, wherein the amplifier circuit board has a pair of lands, the pair of walls of the case each have a tongue in contact with the lands respectively in the state of being bent, and each of the lands and the respective tongue are bonded to each other by soldering.

3. An acceleration sensor according to claim 1, wherein the spacer has a frame surrounding the detection section.

4. An acceleration sensor according to claim 1, wherein the spacer has a plurality of bosses provided on a bottom surface thereof integrally with the spacer for preventing electric contact between the output terminals and the case.

5. An acceleration sensor according to claim 1, wherein areas where the case, the spacer, and the amplifier circuit board are in contact with one another are coated with a coating agent to seal an inner space which is defined by the case, the spacer and the amplifier circuit board and include the detection section.

6. An acceleration sensor according to claim 1, wherein the amplifier circuit board has a circuit adjustment section on a top surface of the substrate thereof for adjusting an amplification factors of the amplifier.

7. An acceleration sensor according to claim 1, wherein the bottom part of the case has a pair of second projections in the vicinity of two corners thereof used for attaching the acceleration sensor to an object for which an acceleration is to be sensed.

8. An acceleration sensor according to claim 1, wherein the pair of walls of the case each have a third projection and a cutout formed at the foot of the third projection, the third projection being bent so that the concave surface thereof faces inward.

9. An acceleration sensor according to claim 1, wherein the pair of first projections of the case have first holes respectively, the detection section has a pair of second holes aligned with the first holes, and the detection section is attached to the first projections of the case in the state of being elevated from the bottom part of the case.

10. An acceleration sensor according to claim 9, wherein the detection section is attached to the case by caulking a rivet inserted through the first holes and the second holes.

* * * * *